United States Patent [19]

Qureshi et al.

[11] Patent Number: 5,002,839
[45] Date of Patent: Mar. 26, 1991

[54] HARDFACING PROCESSES FOR VALVE COMPONENTS

[75] Inventors: Javaid I. Qureshi, Winter Springs, Fla.; William A. Gavilan, Pfafftown, N.C.

[73] Assignee: Westinghouse Electric Corp., Pittsburgh, Pa.

[21] Appl. No.: 422,262

[22] Filed: Oct. 16, 1989

[51] Int. Cl.⁵ .......................................... B22B 15/00
[52] U.S. Cl. ................................ 428/678; 137/625.3
[58] Field of Search ............................. 428/648, 678; 137/625.3

[56] References Cited

U.S. PATENT DOCUMENTS

| | | | |
|---|---|---|---|
| 3,602,261 | 8/1971 | Brown | 137/625.3 |
| 4,705,071 | 11/1987 | Connors, Jr. et al. | 137/625.3 |
| 4,766,932 | 8/1988 | Heymann et al. | 137/625.3 |
| 4,814,236 | 3/1989 | Qureshi et al. | 428/678 |

*Primary Examiner*—Peter D. Rosenberg

[57] ABSTRACT

Improved valve components and methods of repairing and manufacturing valve components are provided by this invention. The valve component includes a valve seat including a buttering layer of austenitic stainless steel and a cobalt-containing, hardfacing layer disposed on the buttering layer. This combination of materials provides a relatively, defect-free welding deposit or repair.

16 Claims, 2 Drawing Sheets

HARDFACING PROCESSES FOR VALVE COMPONENTS

CROSS REFERENCE TO RELATED APPLICATIONS

This application is related to U.S. application Ser. No. 064,721, filed June 22, 1987, now U.S. Pat. No. 4,814,236, issued on Mar. 21, 1989, entitled "Hardsurfaced Power-Generation Turbine Components and Method of Hardsurfacing Metal Substrates Using a Buttering Layer", which is assigned to the assignee of this application and which is also incorporated herein by reference.

FIELD OF THE INVENTION

This invention relates to processes for the fabrication an repair of valve components suitable for use in electric power generation plants, and more particularly, to avoiding or eliminating defects in valve components susceptible to high temperature wear.

BACKGROUND OF THE INVENTION

Steam control valves often used in nuclear and fossil fuel power plants typically include a cylindrical outer housing including a bottom muffler portion, and a moveable plug, typically made from carbon or low alloy steel, which is co-axially aligned within this outer housing and which is slidable within the interior diameter of the housing. The plug typically includes grooves about its circumference in predetermined positions for receiving circular sealing rings and a valve seat, which are sized to be inserted into the grooves. The valve seat of the steam control valve is typically protected from high temperature wear and abrasives by coating its sealing surface with STELLITE-6. Unfortunately, after machining the hardfacing to final tolerances, small imperfections, such as cracks and pores, can often be found in the deposit. To repair these defects, the area is typically mechanically gouged in the area of the defect. The component is then preheated, the gouged surface is repaired with hardfacing weld wire, and then the welded component is stress relieved at about 1200° F., 649° C.

While this technique has proved to be somewhat adequate in preparing valve seats for plugs, it is time-consuming, expensive, often distorts the plug, and creates more defects in both the repaired area as well as the surrounding metal. A large number of such defects can lead to entirely scrapping the valve plug.

Accordingly, a need exists for a manufacturing method and repair procedure for hardfaced valve seats which minimize welding defects. There also remains a need for a welding process which minimizes the necessity of subsequent stress relief operations, reduces the probability of producing cracks in the hardfaced seat area upon cooling from welding temperatures and eliminates the chore of removing the valve seat from the plug to make the repair.

SUMMARY OF THE INVENTION

This invention relates to manufacturing methods and processes for hardfacing valve seats and components, as well as novel valve components and electric power generation plants including these components. The valve components of this invention include the improvement whereby a valve seat is provided with a buttering layer of austenitic stainless steel and a cobalt-containing, hardfacing layer disposed on the buttering layer. The buttering layer of this invention preferably includes a nominal thickness of about 0.0625–0.125 inches, 1.59–3.18 mm, and the cobalt-containing, hardfacing layer preferably includes a nominal thickness of about 0.12–0.31 inches, 3.05–7.87 mm. These thicknesses permit optimum physical properties with minimal base metal distortion.

The novel repair procedure of this invention includes providing a valve seat having a surface coated with a hardfacing layer with at least a first defect disposed therein. This defect is mechanically removed by creating a gouged surface in at least the hardfacing layer. Once the defect has been substantially removed from the hardfacing layer, an austenitic stainless steel buttering layer is deposited onto a portion of the gouged surface, followed by a cobalt-containing, hardfacing alloy for restoring a wear resistant coating on the valve component.

Accordingly, the valve components and procedures of this invention are economical and produce a quality-welded component. The austenitic stainless steel buttering layer disclosed herein provides a buffer between the steel base metal and the preferred hardfacing alloys to minimize differences in the coefficient of thermal expansion. Thus, the valve components of this invention are relatively distortion and defect-free, and need not be stress relieved after welding.

BRIEF DESCRIPTION OF DRAWINGS

The accompanying drawings illustrate preferred embodiments of the invention for the practical application of the principles thereof, and in which.

DESCRIPTION OF THE INVENTION

The present invention provides an electric power generation plant of the type having steam control valve components. The valve components include a valve seat and a buttering layer of austenitic stainless steel having a nominal thickness of about 0.0625–0.125 inches, 1.59–3.18 mm, and a cobalt-containing, hardfacing layer having a nominal thickness of about 0.12–0.31 inches, 3.05–7.87 mm, disposed on the buttering layer.

This invention also provides an improved valve component suitable for use in nuclear and fossil fuel power plants which includes a valve seat disposed about an end portion of a cylindrical valve plug, both of which are preferably made of carbon steel, low alloy steel or 12% chromium steel. The valve seat includes a buttering layer of E309 stainless steel having a nominal thickness of about 0.0625–0.125 inches, 1.59–3.18 mm, and a STELLITE-6 hardfacing layer having a nominal thickness of about 0.12-0.31 inches, 3.05-7.87 mm, disposed on the buttering layer.

This invention also provides a method of repairing a valve component of the type employed in electric power generation plants. This procedure includes providing a valve component including a plug and seat. This valve seat includes a hardfacing layer having at least a first defect disposed therein. Substantially all of this defect is mechanically removed from the hardfacing layer, thereby creating a gouged surface in at least the hardfacing layer, and preferably also in the base metal. Onto a portion of this gouged surface is next deposited a buttering layer comprising austenitic stainless steel, followed by a layer of a cobalt-containing, hardfacing alloy.

Figure 1:
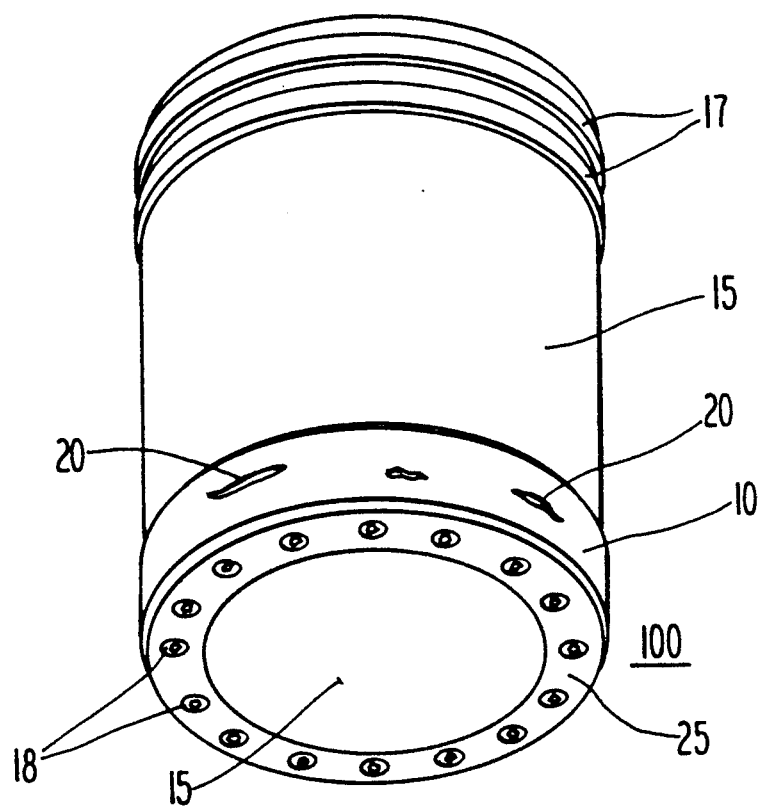
FIG. 1: is a perspective view of the preferred valve component including a plug and STELLITED seat having defects in the STELLITE deposit.
Figure 2:
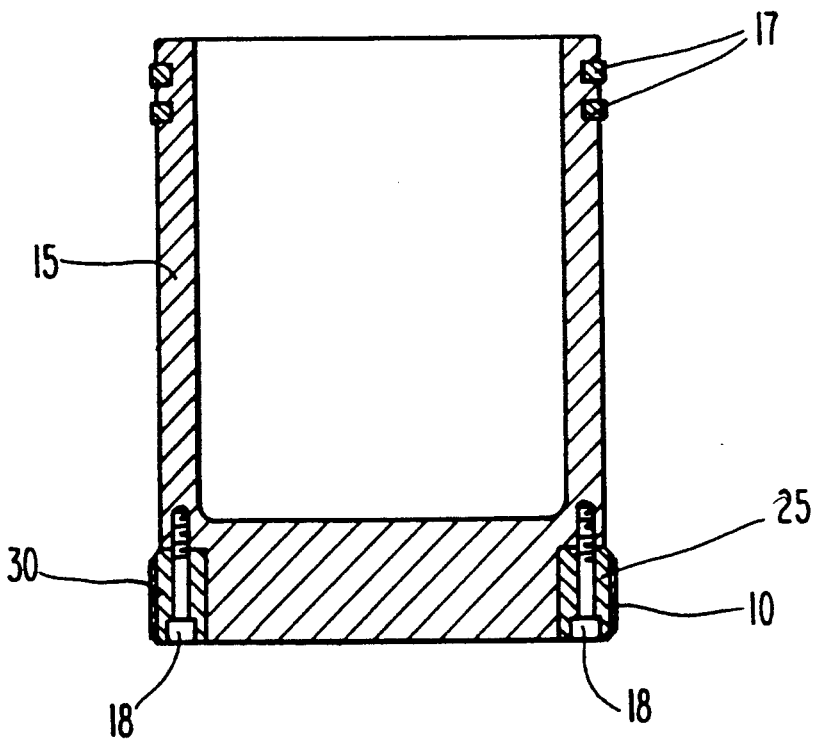
FIG. 2: is a cross-sectional view of the valve component of FIG. 1 illustrating a defect which has been mechanically gouged out of the STELLITE deposit.

With reference to FIG. 1, there is shown a valve component 100 having a valve seat 25 comprising a hardfacing layer 10, preferably comprising STELLITE. The hardfacing layer 10 includes defects 20 which may represent, for instance, welding imperfections such as cracks, slag, or pores. The seat is bolted into adjoining valve plug 15 with bolts 18. The valve plug 15 also includes sealing rings 17 disposed in circumferential notches in the valve plug 15.

In accordance with an important aspect of this invention, the defects 20 are machined or otherwise preferably mechanically "ground out" to produce a gouged surface 30. Alternatively, the gouged surface 30 can be prepared by other means, e.g., carbon-arc, laser or electron-beam. The gouged surface 30 can be deeper than the thickness of the STELLITE hardfacing layer 10, and therefore may extend into a portion of the valve seat 25. After grinding, the gouged surface 30 is preferably die penetrant inspected to verify the complete removal of defects.

Figure 3:
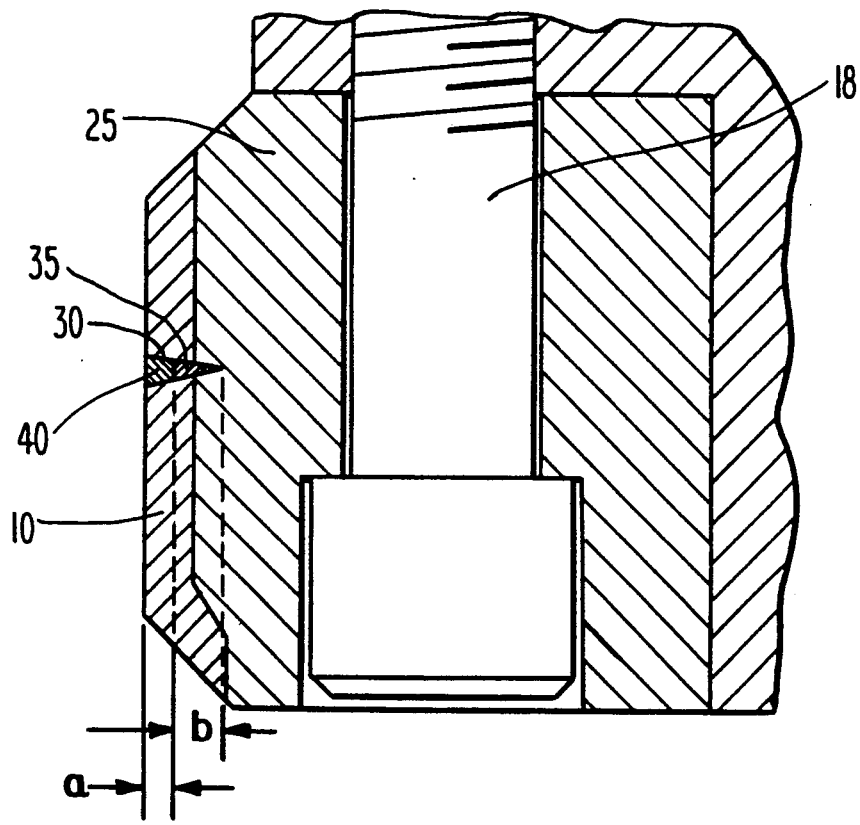
FIG. 3: is an enlarged detail of the left gouged area of FIG. 2 illustrating a repair made with a stainless steel buttering layer (b) followed by a STELLITE hardfacing layer (a)

Referring now to FIG. 3, a preferred repair procedure will now be described. After mechanically removing a defect 20, the area to be repaired is preferably cleaned with alcohol, or an equivalent cleaning fluid. The valve component 100 is then preferably heated to at least about 500° F., 260° C., to minimize thermal stresses in the component during the subsequent welding operation.

The buttering layer 35 is then preferably welded to a nominal thickness of about 0.0625-0.125 inches, 1.59-3.18 mm onto the gouged surface 30. This thickness permits optimum buffering properties without significantly diminishing the ability of the hardfacing to perform.

It has been discovered that buttering layers having thicknesses significantly below this thickness range do not sufficiently protect the base metal and/or hardfacing from defects and distortion. On the other hand, when buttering layers having thicknesses significantly greater than this range are applied, the "cushion" is too large and the hardfacing may crack during service or impact loadings.

Preferably, the buttering layer 35 comprises austenitic stainless steel. Austenitic stainless steels are those containing relatively high concentrations of chromium and nickel, and are readily weldable. Preferable compositional ranges for the austenitic stainless steel selections of this invention include the following types.

TABLE 1

| | | | Austenitic Stainless Steel Nominal Composition, % | | | | | |
|---|---|---|---|---|---|---|---|---|
| Type | Carbon | Manganese | Phosphorus | Sulfur | Silicon | Chromium | Nickel | Molybdenum |
| 301 | 0.15 | 2.0 | 0.045 | 0.03 | 1.00 | 17.0 | 7.0 | — |
| 302 | 0.15 | 2.0 | 0.045 | 0.03 | 1.00 | 18.0 | 9.0 | — |
| 304 | 0.08 | 2.0 | 0.045 | 0.03 | 1.00 | 19.0 | 9.3 | — |
| 304L | 0.03 | 2.0 | 0.045 | 0.03 | 1.00 | 19.0 | 10.0 | — |
| 309 | 0.20 | 2.0 | 0.045 | 0.03 | 1.00 | 23.0 | 13.5 | — |
| E309 | 0.08 max | 1.25-2.50 | 0.030 | 0.03 max | 0.50 | 10.5-25.0 max | 12.5-14.0 | — |
| 310 | 0.25 | 2.0 | 0.045 | 0.03 | 1.50 | 25.0 | 20.5 | — |
| 314 | 0.25 | 2.0 | 0.045 | 0.03 | 2.00 | 24.5 | 20.5 | — |
| 316 | 0.08 | 2.0 | 0.045 | 0.03 | 1.00 | 17.0 | 12.0 | 2.5 |
| 316L | 0.03 | 2.0 | 0.045 | 0.03 | 1.00 | 17.0 | 12.0 | 2.5 |
| 317 | 0.08 | 2.0 | 0.045 | 0.03 | 1.00 | 19.0 | 13.0 | 3.5 |
| 321 | 0.08 | 2.0 | 0.045 | 0.03 | 1.00 | 18.0 | 10.5 | — |
| 347 | 0.08 | 2.0 | 0.045 | 0.03 | 1.00 | 18.0 | 10.5 | — |
| 348 | 0.08 | 2.0 | 0.045 | 0.03 | 1.00 | 18.0 | 11.0 | — |

The buttering layer 35 of this invention is preferably welded using gas-tungsten-arc-welding (GTAW or TIG) techniques, which impart a relatively small amount of heat input into the base metal. Alternatively, the buttering layer 35 can be deposited employing thermal spraying, plasma transferred-arc, shielded metal arc, MIG, or laser techniques.

After air cooling the deposited buttering layer 35 and valve component 100, a hardfacing deposit 40, preferably having a hardness of greater than $30R_c$ and more preferably about $40\text{-}55R_c$, can be applied at least onto the buttering layer 35. The preferred hardfacing material is STELLITE-6, although other cobalt-containing, hardfacing alloys can be employed with similar properties. Some of the preferred compositions for these alloys are included in Table 2.

TABLE 2

| | Solid-Solution Cobalt-Based Alloys Composition, % | | | | | | | | | |
|---|---|---|---|---|---|---|---|---|---|---|
| Type | Ni | Cr | Co | Fe | Mo | Ti | W | Nb | Al | C | Other |
| Haynes 25 (L-605) | 10.0 | 20.0 | 50.0 | 3.0 | — | — | 15.0 | — | — | 0.10 | 1.5 Mn |
| Haynes 188 | 22.0 | 22.0 | 37.0 | 3.0 max | — | — | 14.5 | — | — | 0.10 | 0.90 La |
| S-816 | 20.0 | 20.0 | 42.0 | 4.0 | 4.0 | — | 4.0 | 4.0 | — | 0.38 | — |
| STELLITE-6 | 3.0 max | 25-32 | Balance | 3.0 max | 1.0 max | — | 3.0 | 6.0 | — | — | — |
| STELLITE-6B | 1.0 | 30.0 | 61.5 | 1.0 | — | — | 4.5 | — | — | 1.0 | — |

TABLE 2-continued

| | Solid-Solution Cobalt-Based Alloys Composition, % | | | | | | | | | |
|---|---|---|---|---|---|---|---|---|---|---|
| Type | Ni | Cr | Co | Fe | Mo | Ti | W | Nb | Al | C | Other |
| UMCo-50 | — | 28.0 | 49.0 | 21.0 | — | — | — | — | — | 0.12 max | — |

Cobalt-based heat-resistant alloys are available as welding materials. Preferably, the same welding methods employed in connection with the buttering layer can also be used to deposit the cobalt-based alloys of this invention.

In this regard, the following gas-tungsten-arc-welding (GTAW or TIG) welding procedures are most preferred for depositing the preferred buttering and cobalt-containing hardfacing layers of this invention.

TABLE 3

| | Basic Parameters | |
|---|---|---|
| | E309 | STELLITE-6B |
| Amps | 150–180 | 200–225 |
| Volts | 20–25 | 25–30 |
| Gas Flow | 15 CFM | 15 CFM |
| Filler Wire Diameter | 3/32" | 3/16" |
| Shielding Gas | Argon 99.8% | Argon 99.8% |
| Electrode-Tungsten | 2% thor. | 2% thor. |

Reference is also made to T. B. Jefferson and G. Woods, "Metals and How to Weld Them", James F. Lincoln Arc Welding Foundation, 2nd Edition (1983); and Metals Handbook, Volume 6, "Welding, Brazing and Soldering, 9th Edition ASM (1983), which are hereby incorporated by reference in their entirety.

Following the deposit of the cobalt-containing hardfacing alloy, the entire component and repaired area are permitted to cool under an insulating blanket. The hardfacing deposit 40 is preferably then machined to a thickness of about 0.12–0.18 inches, 3.05–4.75 mm, to provide appropriate hardness properties with sufficiently close tolerances for the operation of the valve component 100. Following cooling, the entire valve seat area is given a penetrant inspection around the repair area.

Figure 4:
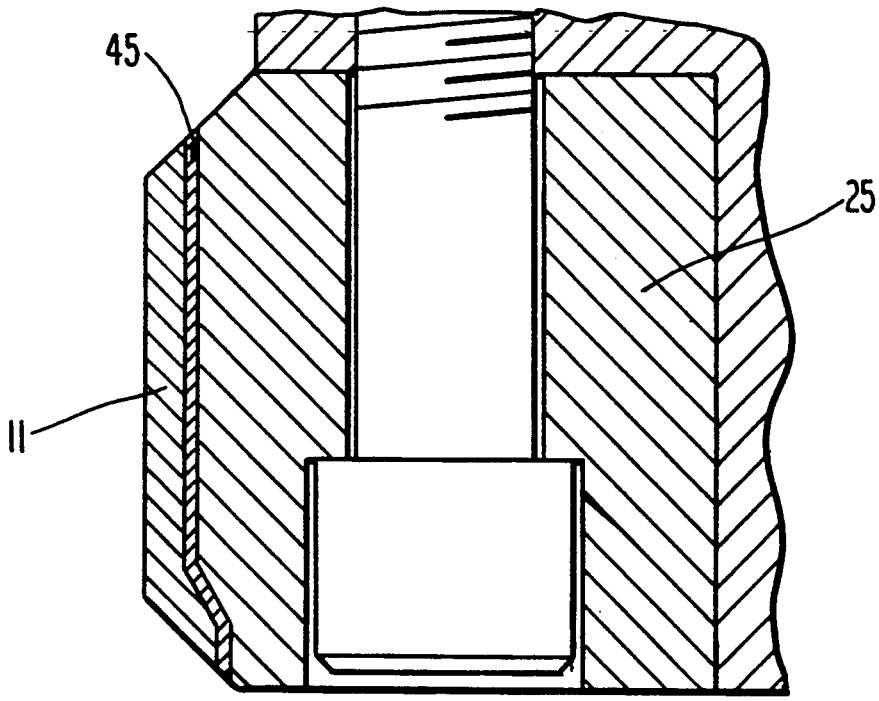
FIG. 4: is an enlarged detail of an alternative embodiment of the valve component of this invention, whereby STELLITE hardfacing is deposited over a stainless steel buttering layer which has been previously deposited substantially along the entire valve seat.

Referring now to FIG. 4, there is shown an enlarged detail of an improved "original equipment" valve component having a buttering layer 45 disposed substantially about the entire valve seat surface 25 prior to a deposition of a cobalt-containing, hardfacing layer 11. The buttering layer 45 is preferably disposed in a thickness of about 0.0625–0.125 inches, 1.59–3.18mm and the hardfacing layer 11 is deposited in a nominal thickness of about 0.12–0.31 inches, 3.05–7.87 mm. The preferred welding parameters and alloys disclosed previously with respect to buttering layer 35 and hardfacing deposit 40, can also be employed for depositing buttering layer 45 and hardfacing layer 11.

From the foregoing, it can be realized that this invention provides improved repair and original equipment manufacturing sequences, as well as improved hardfaced valve components for use in power generation equipment. The repair techniques disclosed herein can produce quality welded components without the need for removing the seat from the plug. The disclosed components and procedures are ideally suited for high temperature service and are relatively defect-free. Although various embodiments have been illustrated, this was for the purpose of describing, and not limiting the invention. Various modifications, which will become apparent to one skilled in the art, are within the scope of this invention described in the attached claims.

We claim:

1. An electric power generation plant having a plurality of steam controlled valve components, each of said valve components comprising:

a valve seat having a steel base, a buttering layer of austenitic stainless steel being welded onto the steel surface of said valve seat, said buttering layer having a nominal thickness of about 0.0625–0.125 inches, 1.59–3.18 mm, and a cobalt-containing, hardfacing layer having a nominal thickness of about 0.12–0.31 inches, 3.05–7.87 mm, welded on said buttering layer.

2. The electric power generation plant of claim 1 wherein said austenitic stainless steel comprises E309 stainless steel.

3. The electric power generation plant of claim 2 wherein said cobalt-containing hardfacing layer comprises STELLITE-6.

4. The electric power generation plant of claim 3 wherein said cobalt-containing hardfacing layer comprises a nominal machined thickness of about 0.12–0.187 inches, 3.05–4.75 mm.

5. An improved valve component suitable for use in nuclear and fossil fuel power plants, comprising: a cylindrical valve plug, a valve seat disposed about an end portion of said cylindrical valve plug, said valve seat including a buttering layer of austenitic stainless steel being welded into the surface of said valve seat, and a cobalt-containing hardfacing layer having a hardness greater than about 30$R_c$ welded on said buttering layer. greater than about 30$R_c$ disposed on said buttering layer.

6. The valve component of claim 5 wherein said austenitic stainless steel comprises E309 stainless steel.

7. The valve component of claim 6 wherein said buttering layer comprises a nominal thickness of about 0.0625–0.125 inches, 1.5–3.18 mm.

8. The valve component of claim 6 wherein said buttering layer comprises a nominal thickness of about 0.1 inches, 2.54 mm.

9. The valve component of claim 7 wherein said cobalt-containing hardfacing layer comprises STELLITE-6.

10. The valve component of claim 9 wherein said cobalt-containing hardfacing layer comprises a nominal thickness of about 0.12–0.31 inches, 3.05–7.87 mm.

11. The valve component of claim 9 wherein said cobalt-containing hardfacing layer comprises a machined nominal thickness of about 0.12–0.187 inches, 3.05–4.75 mm.

12. The valve component of claim 5 wherein said valve plug comprises carbon steel, 12% chromium steel or low alloy steel.

13. The valve component of claim 5 wherein said valve seat comprises a carbon steel, 12% chromium steel, or low alloy steel.

14. An improved valve component suitable for use in nuclear and fossil fuel power plants, comprising a cylindrical outer housing, a steel valve plug disposed within said housing, and a valve seat disposed around an end portion of said valve plug, said valve plug comprising carbon-, 12% chromium- or low alloy-steel, said valve seat having a steel base, a buttering layer comprising E309 stainless steel being welded onto the steel surface of said valve seat, said buttering layer having a nominal thickness of about 0.0625–0.125 inches, 1.5–3.18 mm, and a STELLITE-6 hardfacing layer having a nominal thickness of about 0.12–0.31 inches, 3.05–7.87 mm, welded on said buttering layer.

15. The electric power generation plant having a plurality of steam controlled valve components of claim 1, wherein the buttering layer of austenitic stainless steel has a maximum nickel concentration of about 20.5 percent by weight.

16. The improved valve component of claim 5, wherein the buttering layer of austentic stainless steel has a maximum nickel concentration of about 20.5 percent by weight.

* * * * *